US008609011B2

(12) United States Patent
Hoess et al.

(10) Patent No.: US 8,609,011 B2
(45) Date of Patent: Dec. 17, 2013

(54) METHOD FOR THE PRODUCTION OF LIGHT-DIFFUSING MOULDED ITEMS WITH EXCELLENT OPTICAL CHARACTERISTICS

(75) Inventors: Werner Hoess, Griesheim (DE); Arne Schmidt, Darmstadt (DE); Klaus Albrecht, Mainz (DE); Klaus Schultes, Wiesbaden (DE)

(73) Assignee: Evonik Roehm GmbH, Darmstadt (DE)

( * ) Notice: Subject to any disclaimer, the term of this patent is extended or adjusted under 35 U.S.C. 154(b) by 1415 days.

(21) Appl. No.: 10/546,241

(22) PCT Filed: Mar. 2, 2004

(86) PCT No.: PCT/EP2004/002059
§ 371 (c)(1),
(2), (4) Date: Aug. 22, 2005

(87) PCT Pub. No.: WO2004/098857
PCT Pub. Date: Nov. 18, 2004

(65) Prior Publication Data
US 2006/0175735 A1    Aug. 10, 2006

(30) Foreign Application Priority Data
May 6, 2003    (DE) .................................. 103 20 318

(51) Int. Cl.
*B28B 7/00*    (2006.01)
(52) U.S. Cl.
USPC .................................... 264/328.18
(58) Field of Classification Search
USPC ..................... 264/328.18; 428/474.9
See application file for complete search history.

(56) References Cited

U.S. PATENT DOCUMENTS

| | | | |
|---|---|---|---|
| 4,024,306 A * | 5/1977 | Takamizawa et al. ......... 427/387 |
| 4,513,118 A | 4/1985 | Suetterlin et al. | |
| 5,063,259 A * | 11/1991 | Wanat et al. ................... 523/201 |
| 5,270,397 A | 12/1993 | Rhein et al. | |
| 5,650,107 A | 7/1997 | Vetter et al. | |
| 5,750,268 A * | 5/1998 | Mace et al. ................. 428/475.8 |
| 6,495,649 B2 | 12/2002 | Harada et al. | |
| 6,803,416 B2 | 10/2004 | Schultes et al. | |
| 7,371,795 B2 | 5/2008 | Wicker et al. | |
| 7,381,552 B2 | 6/2008 | Menzler et al. | |
| 7,456,239 B2 | 11/2008 | Theil et al. | |
| 2002/0123565 A1* | 9/2002 | Schultes et al. ................. 525/50 |
| 2003/0021917 A1* | 1/2003 | Hotaka et al. ................... 428/29 |
| 2003/0207082 A1* | 11/2003 | Maas et al. ..................... 428/141 |
| 2004/0104501 A1 | 6/2004 | Petereit et al. | |
| 2004/0116567 A1 | 6/2004 | Schmitt et al. | |
| 2004/0253443 A1* | 12/2004 | Anselmann et al. .......... 428/403 |
| 2005/0080188 A1 | 4/2005 | Schultes et al. | |
| 2005/0152977 A1 | 7/2005 | Petereit et al. | |
| 2006/0052515 A1 | 3/2006 | Schultes et al. | |
| 2006/0147714 A1 | 7/2006 | Schultes et al. | |
| 2006/0281887 A1 | 12/2006 | Petereit et al. | |
| 2007/0055017 A1 | 3/2007 | Schultes et al. | |
| 2007/0066708 A1 | 3/2007 | Goldacker et al. | |
| 2007/0122624 A1 | 5/2007 | Schultes et al. | |
| 2007/0123610 A1 | 5/2007 | Schultes et al. | |
| 2007/0197703 A1 | 8/2007 | Neuhauser et al. | |
| 2007/0222117 A1 | 9/2007 | Hoess et al. | |
| 2007/0276093 A1 | 11/2007 | Schultes et al. | |
| 2008/0132627 A1 | 6/2008 | Schultes et al. | |
| 2008/0161469 A1 | 7/2008 | Hoss et al. | |
| 2008/0242782 A1 | 10/2008 | Hager et al. | |
| 2008/0248298 A1 | 10/2008 | Numrich et al. | |
| 2010/0148401 A1 | 6/2010 | Schultes et al. | |
| 2010/0167045 A1 | 7/2010 | Schultes et al. | |
| 2010/0174022 A1 | 7/2010 | Schultes et al. | |

FOREIGN PATENT DOCUMENTS

| | | |
|---|---|---|
| AU | 684563 | 6/1995 |
| DE | 4327464 A1 | 2/1995 |
| EP | 113924 | 7/1984 |
| EP | 269324 | 6/1988 |
| EP | 342283 | 11/1989 |
| EP | 465049 | 1/1992 |
| EP | 522351 | 1/1993 |
| EP | 0 656 548 | 6/1995 |
| EP | 656548 | 6/1995 |
| EP | 683028 | 11/1995 |
| EP | 1116741 | 7/2001 |
| EP | 1219641 | 7/2002 |
| EP | 1 312 472 A1 | 5/2003 |
| FR | 2 785 221 | 5/2000 |
| JP | 63-077940 | 4/1988 |

(Continued)

OTHER PUBLICATIONS

Rasmussen, WL, Novel Carbazole Based Methacrylates, Acrylates, and Dimethacrylates to Produce High Refractive Index, Virgina Tech Theses, http://scholar.lib.vt.edu/theses/available/etd-12202001-135708/unrestricted/ThesisChapter4Part5B.PDF.*
Brillhart, Technical Conference of the Society of Plastics Engineers; Indianapolis, May 5-10, 1996 http://books.google.com/books?id=IR_cGJCpikYC&pg=PA2774&lpg=PA2774&dq=PMMA+yield+stress&source=web&ots=QK5IM9beYT&sig=LK2NJszNTCZe0E8v0kKnPuWwXH8&hl=en&sa=X&oi=book_result&resnum=10&ct=result#PPA2629,M1.*
Translation of JP 05039401A.*
U.S. Appl. No. 60/831,222, filed Jul. 17, 2006, Hager, et al.

(Continued)

*Primary Examiner* — Jacob Thomas Minskey
(74) *Attorney, Agent, or Firm* — Oblon, Spivak, McClelland, Maier & Neustadt, L.L.P.

(57) ABSTRACT

The invention relates to an injection molding method for the production of a complex, high optical quality light-diffusing molded item. The molding material used comprises a matrix made of polymethyl(meth)acrylate and spherical plastic particles whose particle size ranges from 1-24 μm and the concentration thereof ranges from 0.05-30 wt.-% in relation to the weight of the polymethyl(meth)acrylate. The spherical particles exhibit a refractive index differential in relation to the polymethyl(meth)acrylate matrix of 0.01 0.2.

30 Claims, No Drawings

(56) References Cited

FOREIGN PATENT DOCUMENTS

| | | |
|---|---|---|
| JP | 01-026617 | 1/1989 |
| JP | 01-146910 | 6/1989 |
| JP | 1172412 | 7/1989 |
| JP | 5-39401 | 2/1993 |
| JP | 9-193218 | 7/1997 |
| JP | H1119928 | 1/1999 |
| JP | 11-179856 | 7/1999 |
| JP | 2000-186148 | 7/2000 |
| JP | 2002-113803 | 4/2002 |
| JP | 2002-226716 | 8/2002 |
| WO | 03/098270 | 11/2003 |

OTHER PUBLICATIONS

U.S. Appl. No. 12/300,408, filed Nov. 11, 2008, Hoess, et al.
U.S. Appl. No. 12/436,809, filed May 7, 2009, Schultes, et al.
U.S. Appl. No. 12/521,004, filed Jun. 24, 2009, Schultes, et al.
U.S. Appl. No. 12/525,160, filed Jul. 30, 2009, Schultes, et al.
U.S. Appl. No. 12/738,033, filed Apr. 14, 2010, Schultes, et al.
U.S. Appl. No. 12/682,405, filed Apr. 9, 2010, Schmidt, et al.
U.S. Appl. No. 12/922,627, filed Sep. 14, 2010, Khrenov, et al.

* cited by examiner

METHOD FOR THE PRODUCTION OF LIGHT-DIFFUSING MOULDED ITEMS WITH EXCELLENT OPTICAL CHARACTERISTICS

CROSS-REFERENCE TO RELATED APPLICATIONS

The present application is a 35 U.S.C. §371 National Stage patent application of International patent application PCT/EP04/002059, filed on Mar. 2, 2004, which claims priority to German patent application DE 10320318.4, filed on May 6, 2003.

BACKGROUND OF THE INVENTION

1. Field of the Invention

The present invention relates to a process for producing protective coverings for lamps, polymethyl (meth)acrylate being given light-scattering or diffusing properties. This is achieved via admixture of scattering particles to the plastics matrix, the refractive index of the scattering particles differing from that of the polymethyl(meth)acrylate.

2. Discussion of the Background

Mixtures of this type composed of polymethyl (meth)acrylate and scattering particles are especially suitable for the lighting sector. For example, EP-A 0 656 548 describes uniformly illuminated optical conductor plates composed of a methyl methacrylate matrix and of scattering particles embedded therein, composed of a crosslinked polymer which may contain acrylic esters, methacrylic esters and styrene. The order of size of the scattering particles is from 2 to 20 µm, and they are incompatible with the plastic of the matrix.

There are also known lampshades which comprise plastics particles as scattering media. For example, the document JP11179856 describes multilayer sheets with at least one layer which encompasses a polymethyl methacrylate matrix and also encompasses crosslinked polymethyl methacrylate beads as a scattering/matting agent, the content of the beads being in the range from 0.5 to 25% by weight. The size of the beads is in the range from 3 to 30 µm, and the examples here describe only sheets of thickness 2 mm, which comprise about 3% by weight of scattering beads whose size is about 6 µm.

The Japanese specification JP-A 418346 describes light-scattering multilayer sheets with a layer composed of methyl methacrylate, this layer comprising from 1 to 20% by weight of crosslinked styrene particles whose average size is from 1 to 30 µm.

The moulding compositions described are usually further processed via extrusion to give screens or optical conductor plates. For the production of complex moulded parts, e.g. specialized headlamp covers, and parts with cavities or perforations, the extruded products have to be further processed via forming processes. The high costs which arise via the additional operation are a disadvantage of this procedure.

SUMMARY OF THE INVENTION

In the light of the problems stated and discussed above relating to the prior art, it was an object of the present invention to provide a process which produces a light-scattering moulding and which is particularly inexpensive, and which permits high productivity. This process is to be capable of being carried out with the apparatus known from the prior art.

The intention was moreover to provide a process which gives light-scattering mouldings with high optical quality, and which substantially avoids the occurrence of optical defects and inhomogeneity, e.g. streaking, clouding, and formation of clearly visible weld lines.

A further object of the present invention was to provide a process for the production of a light-scattering moulding with no, or with only a very small number of, surface defects.

The invention was also intended to provide a process which gives light-scattering mouldings with excellent properties. In particular, the intention was that the mouldings have high impact strength, weather resistance and scratch resistance.

The intention was moreover to provide a process which gives light-scattering mouldings which show no discoloration via light-induced chemical physical decomposition when exposed to light over a prolonged period.

A further object of the invention was the provision of a process which gives mouldings with excellent optical properties, e.g. light transmittance and scattering power.

The process of the present invention achieves these objects, and also achieves other objects which, although they are not specifically mentioned, are obvious or necessary consequences of the circumstances discussed herein.

Complex light-scattering mouldings can be produced at low cost and with high optical quality by producing these mouldings by injection moulding from a moulding composition which encompasses polymethyl(meth)acrylate and spherical plastics particles whose size is in the range from 1 to 24 µm at a concentration in the range from 0.05 to 30% by weight, based on the weight of the polymethyl(meth)acrylate, the refractive index of the spherical particles differing by from 0.01 to 0.2 from that of the polymethyl(meth)acrylate matrix. In this process, the moulding composition is injected into an appropriate mould which can be used to produce a complex moulding.

The inventive measures also achieve the following advantages:

It is possible to produce mouldings in which the amount of optical defects and inhomogeneity, such as clouding, streaking and weld lines, is very small. Clouding and streaking are terms used to describe clouded sites within the moulding, at which the transparency of the part is less than that in the other regions, and which are detrimental both to ideal scattering action and to appearance.

The mouldings produced according to the invention have fewer surface defects.

Furthermore, the mouldings produced according to the invention have excellent optical properties, e.g. light transmittance, yellowness index and scattering power.

The mechanical properties of the mouldings produced are likewise excellent.

The mouldings produced show no, or only very slight, discoloration via light-induced chemical or physical decomposition on exposure to light over a prolonged period.

These properties make the mouldings produced according to the invention particularly suitable for applications in the lighting sector.

The inventive process also features improved flow properties of the moulding composition.

The injection-moulding technology used in the present invention for the processing of thermoplastic moulding compositions is known to the person skilled in the art. Examples of overviews can be found in:

W. Mink, Grundzüge der Spritzgießtechnik [Fundamentals of injection-moulding technology], 1st edition, Zechner & Hüthig Verlag, Speyer, 1966; and Saechtling, Kunststofftaschenbuch [Plastics handbook], 26th edition, Carl Hanser Verlag, 1995.

Either hot-runner technology or cold-runner technology may be used to carry out the injection moulding of the mouldings. Hot-runner technology has some advantages over cold-runner technology, e.g. the implementation of long flow paths, so that the gate can be ideally situated, no-loss operation via avoidance of sprue waste, the possibility of applying hold pressure for a longer period, since the material does not freeze in the gate, and the opportunity to implement shorter cycle times. Among the disadvantages are the higher mould costs resulting from more complicated design, the higher susceptibility to failure, and the greater difficulty of maintenance.

DETAILED DESCRIPTION OF THE INVENTION

The moulding composition encompasses polymethyl (meth)acrylate (PMMA), which forms the matrix in which the spherical plastics particles have been embedded. The matrix preferably encompasses at least 30% by weight, based on the total weight of the moulding composition, of polymethyl(meth)acrylate. According to one particular aspect of the present invention, the poly(meth)acrylates of the matrix of the moulding composition have a refractive index in the range from 1.46 to 1.54, measured for the Na D line (589 nm) at 20° C.

Polymethyl(meth)acrylates are generally obtained via free-radical polymerization of mixtures which comprise methyl (meth)acrylate. These mixtures generally comprise at least 40% by weight, preferably at least 60% by weight, and particularly preferably at least 80% by weight, of methyl (meth)acrylate, based on the weight of the monomers.

Alongside this, these mixtures for preparing polymethyl (meth)acrylates may comprise other (meth)acrylates which are copolymerizable with methyl methacrylate. The term (meth)acrylates encompasses methacrylates and acrylates, and also mixtures of the two.

These monomers are well known. They include (meth) acrylates derived from saturated alcohols, for example methyl acrylate, ethyl (meth)acrylate, propyl (meth)acrylate, n-butyl (meth)acrylate, tert-butyl (meth)acrylate, pentyl (meth)acrylate and 2-ethylhexyl (meth)acrylate;
(meth)acrylates derived from unsaturated alcohols, for example oleyl (meth)acrylate, 2-propynyl (meth)-acrylate, allyl (meth)acrylate, vinyl (meth)acrylate;
aryl (meth)acrylates, such as benzyl (meth)acrylate or phenyl (meth)acrylate, where in each case the aryl radicals may be unsubstituted or have up to four substituents;
cycloalkyl (meth)acrylates, such as 3-vinylcyclohexyl (meth) acrylate, bornyl (meth)acrylate;
hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)-acrylate;
glycol di(meth)acrylates, such as 1,4-butanediol (meth)acrylate,
(meth)acrylates of ether alcohols, for example tetra-hydrofurfuryl (meth)acrylate, vinyloxyethoxyethyl (meth) acrylate;
amides and nitriles of (meth)acrylic acid, for example N-(3-dimethylaminopropyl)(meth)acrylamide, N-(diethylphosphono)(meth)acrylamide, 1-methacryloylamido-2-methyl-2-propanol;
sulphur-containing methacrylates, such as ethyl-sulphinylethyl (meth)acrylate,
4-thiocyanatobutyl (meth)acrylate,
ethylsulphonylethyl (meth)acrylate, thiocyanatomethyl (meth)acrylate,
methylsulphinylmethyl (meth)acrylate, bis((meth)acryloyloxyethyl) sulphide;
polyfunctional (meth)acrylates, such as trimethyloyl-propane tri(meth)acrylate.

Besides the abovementioned (meth)acrylates, the mixes to be polymerized may also comprise other unsaturated monomers copolymerizable with the abovementioned (meth)acrylates.

They include 1-alkenes, such as 1-hexene, 1-heptene; branched alkenes, such as vinylcyclohexane, 3,3-dimethyl-1-propene, 3-methyl-1-diisobutylene, 4-methyl-1-pentene; acrylonitrile;
vinyl esters, such as vinyl acetate;
styrene, substituted styrenes having an alkyl substituent in the side chain, e.g. α-methylstyrene and α-ethylstyrene, substituted styrenes having an alkyl substituent on the ring, such as vinyltoluene and p-methylstyrene, halogenated styrenes, such as mono-chlorostyrenes, dichlorostyrenes, tribromostyrenes and tetrabromostyrenes;
heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;
vinyl and isoprenyl ethers;
maleic acid derivatives, such as maleic anhydride, methylmaleic anhydride, maleimide, methylmaleimide; and dienes, such as divinylbenzene.

The amount generally used of these comonomers is from 0 to 60% by weight, preferably from 0 to 40% by weight, and particularly preferably from 0 to 20% by weight, based on the weight of the monomers, and these compounds may be used individually or in the form of a mixture.

The polymerization is generally initiated using known free-radical initiators. Among the preferred initiators are, inter alia, the azo initiators well-known to the person skilled in the art, for example AIBN and 1,1-azobiscyclohexanecarbonitrile, and also peroxy compounds, such as methyl ethyl ketone peroxide, acetylacetone peroxide, dilauroyl peroxide, tert-butyl 2-ethylperhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the abovementioned compounds with one another, and also mixtures of the abovementioned compounds with compounds not mentioned but likewise capable of forming free radicals.

The amount often used of these compounds is from 0.01 to 10% by weight, preferably from 0.5 to 3% by weight, based on the weight of the monomers.

Use may be made here of various poly(meth)acrylates which differ, for example in their molecular weight or in their monomeric constitution.

The moulding composition may moreover comprise other polymers in order to modify its properties. Among these are, inter alia, polyacrylonitriles, polystyrenes, polyethers, polyesters, polycarbonates and polyvinyl chlorides. These polymers may be used individually or in the form of a mixture, and it is also possible here to use copolymers which are derivable from the abovementioned polymers.

The weight-average molar mass Mw of the homo- and/or copolymers to be used in the moulding composition may vary within a wide range, the molar mass usually being matched to the intended use and to the mode of processing of the moulding composition. However, it is generally in the range from 20 000 to 1 000 000 g/mol, preferably from 50 000 to 500 000 g/mol and particularly preferably from 80 000 to 300 000 g/mol, with no intended resultant restriction.

In one particular embodiment of the present invention, the moulding composition has at least 70% by weight, preferably at least 80% by weight, and particularly preferably at least 90% by weight, of polymethyl (meth)acrylate, based on the weight of the moulding composition.

Particularly preferred polymers for preparing the moulding compositions are commercially obtainable from the producer CYRO Industries with the trademark ACRYLITE®.

Alongside the matrix described above, composed of poly(meth)acrylate, the moulding composition encompasses spherical plastics particles.

The size of the plastics particles (average diameter-weight average) is in the range from 1 to 24 µm, preferably in the range from 2 to 15 µm, and still more preferably in the range from 3 to 14 µm.

The particles advantageously have maximum narrowness of size distribution. A size of at least 1 µm is preferably possessed by at least 60% of the spherical plastics particles within the moulding composition used in the inventive process, and a size of more than 15 µm is preferably possessed by at most 30% of the spherical plastics particles.

The proportion by weight of the plastics particles, based on the weight of the polymethyl(meth)acrylate, is from 0.05 to 30% by weight. In one preferred embodiment, the proportion by weight of spherical plastics particles in the moulding composition is from 0.1 to 25% by weight.

The spherical particles preferably have uniform distribution within the polymethyl(meth)acrylate matrix of the moulding composition, with no significant aggregation or agglomeration of the particles. Uniform distribution means that the concentration of particles within the matrix is substantially constant.

The mixing of the matrix with the plastics particles to give the moulding composition which is used in the inventive injection-moulding process preferably takes place via mixing in the melt, by means of a single- or twin-screw extruder, with no intended resultant limitation.

For the purposes of the present invention, the term spherical means that the plastics particles preferably have a spherical shape, but it is clear to the person skilled in the art that, as a consequence of the methods of production, is also possible that plastics particles with some other shape may be present, or that the shape of the plastics particles may deviate from the ideal spherical shape.

The term spherical therefore means that the ratio of the largest dimension of the plastics particles to the smallest dimension is not more than 4, preferably not more than 2, each of these dimensions being measured through the centre of gravity of the plastics particles. Based on the number of plastics particles, at least 70% are preferably spherical, particularly at least 90%.

The particle size, and also the particle size distribution, may be determined by means of a laser extinction method. To this end, use may be made of a Galai-CIS-1 from the company L.O.T. GmbH, the method of measurement for particle size determination being found in the user manual.

The plastics particles which can be used according to the invention are not subject to any particular restriction. The nature of the plastic from which the plastics particles are produced is therefore substantially non-critical, but refraction of light takes place at the phase boundary between the plastics beads and the matrix plastic.

Accordingly, the refractive index of the plastics particles, measured for the Na-D line (589 nm) at 20° C. differs from the refractive index no of the matrix plastic by from 0.01 to 0.2 units.

It is particularly preferable to use plastics particles whose heat resistance extends to at least 200° C., in particular at least 250° C., with no intended resultant restriction. The term heat-resistant here means that the particles are not subject to any substantial thermal degradation.

The heat resistance may be determined by a thermogravimetric method. The method of determination is familiar to the person skilled in the art. When the process is used, the weight loss of the plastics specimen to be tested is not more than 2% by weight from heating to the stated temperature under inert gas.

The structure of preferred plastics particles comprises:
b1) from 25 to 99.9 parts by weight of monomers which have aromatic groups as substituents, for example styrene, α-methylstyrene, ring-substituted styrenes and halogenated styrenes, phenyl (meth)-acrylate, benzyl (meth)acrylate, 2-phenylethyl (meth)acrylate, 3-phenylpropyl (meth)acrylate or vinyl benzoate; and also
b2) from 0 to 60 parts by weight of an acrylic and/or methacrylic ester having 1 to 12 carbon atoms in the aliphatic ester radical, these being copolymerizable with the monomers b1), and mention may be made here of the following by way of example: methyl (meth)acrylate, ethyl (meth)-acrylate, n-propyl (meth)acrylate, isopropyl (meth)acrylate, n-butyl (meth)acrylate, isobutyl (meth)acrylate, tert-butyl (meth)acrylate, cyclohexyl (meth)acrylate, 3,3,5-trimethylcyclohexyl (meth)acrylate, 2-ethylhexyl (meth)acrylate, norbornyl (meth)acrylate or isobornyl (meth)-acrylate;
b3) from 0.1 to 15 parts by weight of crosslinking comonomers which have at least two ethylenically unsaturated groups copolymerizable by a free-radical route with b1) and, where appropriate, with b2), examples being divinylbenzene, glycol di(meth)acrylate, 1,4-butanediol di(meth)-acrylate, polyethylene glycol dimethacrylate, allyl (meth)acrylate, triallyl cyanurate, diallyl phthalate, diallyl succinate, pentaerythritol tetra(meth)acrylate or trimethylolpropane tri-(meth)acrylate, where the amounts of the comonomers b1), b2) and b3) give a total of 100 parts by weight.

EP 0 656 548 describes the plastics particles described above, and moulding compositions which comprise these particles and (methyl) methacrylate polymer.

The production of crosslinked plastics particles is known to the person skilled in the art. For example, the scattering particles may be produced by emulsion polymerization, for example as described in EP-A 342 283 or EP-A 269 324, and very particularly preferably via organic-phase polymerization, for example as described in the German Patent Application P 43 27 464.1. The last-mentioned polymerization technique gives particularly narrow particle size distributions or, in other words, particularly small deviations of the particle diameters from the average particle diameter.

Particularly preferred plastics particles encompass crosslinked polystyrenes. Particles of this type may be obtained via suspension polymerization of a styrene monomer, as listed above in b1), and of a crosslinking monomer, as listed above in b3), particular preference being given to styrene and divinylbenzene. It is also possible to use a mixture of two or more styrene monomers from b1). The proportion by weight of the styrene polymer in the particles is preferably from 80 to 95% by weight. The proportion by weight of the crosslinking monomer is preferably from 5 to 20%. In order to take account of uniformity of light diffusion and of appearance, it is preferable to use polystyrene particles which were produced by suspension polymerization, as described in JP 64 266 17, JP 1 146 910, JP 1172412 and JP-A 418 346. JP-A 418 346 also describes moulding compositions which encompass polystyrene particles and (methyl) methacrylate polymer.

Particularly preferred particles composed of crosslinked polystyrene are moreover commercially available from Sekisui Plastics Co., Ltd. with the trademarks Techpolymer® SBX-4, Techpolymer® SBX-6, Techpolymer® SBX-8 and Techpolymer® SBX-12.

Other particularly preferred spherical plastics particles which are used as scattering agents comprise silicones. By way of example, particles of this type are obtained via hydrolysis and polycondensation of organotrialkoxysilanes and/or tetraalkoxysilanes, these being described by the formulae

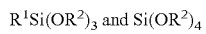

where $R^1$ is, by way of example, a substituted or unsubstituted alkyl group, an alkenyl group or a phenyl group, and the radical $R^2$ of the hydrolysable alkoxy group is an alkyl group, such as methyl, ethyl or butyl, or an alkoxy-substituted hydrocarbon group, e.g. 2-methoxyethyl or 3-ethoxyethyl. Examples of organotrialkoxysilanes are methyltrimethoxysilane, methyltriethoxysilane, methyl-n-propoxysilane, methyltriisopropoxysilane and methyltris(2-methoxyethoxy)silane.

The abovementioned silane compounds, and processes for the production of spherical silicone particles therefrom, are known to the person skilled in the art and can be found in the specifications EP 1 116 741, JP 63-077940 and JP 2000-186148.

Silicone scattering agents particularly preferably used in the present invention are obtainable from the company GE Bayer Silicones with the trademarks TOSPEARL® 120 and TOSPEARL® 3120.

The moulding compositions for producing the moulding may comprise conventional additives/adjuvants of any type. Among these are, inter alia, dyes, antistatic agents, antioxidants, moulding-release agents, flame retardants, lubricants, flow improvers, fillers, light stabilizers and organophosphorus compounds, such as phosphites or phosphonates, pigments, agents providing weathering resistance and plasticizers. However, the amount of additives is limited in relation to the intended use. For example, neither the light-scattering properties of the moulding composition nor its transparency should be excessively impaired by additives.

In one particular aspect of the present invention, the moulding composition may be given improved mechanical resistance properties via an impact modifier. These impact modifiers for polymethacrylate plastics are well-known, and examples of descriptions of the preparation and constitution of impact-modified polymethacrylate moulding compositions are found in EP-A 0 113 924, EP-A 0 522 351, EP-A 0 465 049 and EP-A 0 683 028, inter alia.

Preferred impact-resistant moulding compositions have from 70 to 99% by weight of polymethyl(meth)acrylates. These polymethyl(meth)acrylates have been described above.

In one particular aspect of the present invention, the polymethyl(meth)acrylates used to prepare impact-modified moulding compositions are obtained via free-radical polymerization of mixtures which encompass from 80 to 100% by weight, preferably from 90 to 98% by weight, of methyl methacrylate and, where appropriate, from 0 to 20% by weight, preferably from 2 to 10% by weight, of other comonomers capable of free-radical polymerization, these likewise having been listed above. Particularly preferred comonomers are, inter alia, $C_1$-$C_4$-alkyl (meth)acrylates, in particular methyl acrylate, ethyl acrylate or butyl methacrylate.

The average molar mass Mw of the polymethyl (meth) acrylates for preparing particularly impact-resistant moulding compositions is preferably in the range from 90 000 to 200 000 g/mol, in particular from 100 000 to 150 000 g/mol.

Preferred impact-resistant moulding compositions comprise from 1 to 60% by weight, preferably from 2 to 50% by weight, particularly preferably from 3 to 45% by weight, in particular from 5 to 42% by weight, of an impact modifier, this being an elastomer phase composed of crosslinked polymer particles.

The impact modifier may be attained in a manner known per se via bead polymerization or via emulsion polymerization.

Preferred impact modifiers are crosslinked particles whose average particle size is in the range from 50 to 1000 nm, preferably from 60 to 500 nm and particularly preferably from 80 to 450 nm.

By way of example, these particles may be obtained via free-radical polymerization of mixtures which generally comprise at least 40% by weight, preferably from 50 to 70% by weight, of methyl methacrylate, from 20 to 50% by weight, preferably from 25 to 45% by weight, of butyl acrylate, and also from 0.1 to 2% by weight, preferably from 0.5 to 1% by weight, of a crosslinking monomer, e.g. a polyfunctional (meth)acrylate, e.g. allyl methacrylate, and which comprise comonomers which can be copolymerized with the abovementioned vinyl compounds.

Among the preferred comonomers are, inter alia, $C_1$-$C_4$-alkyl (meth)acrylates, such as ethyl acrylate or butyl methacrylate, preferably methyl acrylate, or other monomers including vinyl groups capable of polymerization, e.g. styrene. The mixture for producing the abovementioned particles may preferably encompass from 0 to 30% by weight, with preference from 0.5 to 15% by weight, of comonomers.

Particularly preferred impact modifiers are polymer particles which have a two-layer, or particularly a three-layer, core-shell structure. These core-shell polymers are described in EP-A 0 113 924, EP-A 0 522 351, EP-A 0 465 049 and EP-A 0 683 028, inter alia.

Particularly preferred impact modifiers based on acrylate rubber have the following structure, inter alia:
Core: Polymer with at least 90% by weight methyl methacrylate content, based on the weight of the core.
Shell 1: Polymer with at least 80% by weight butyl acrylate content, based on the weight of the first shell.
Shell 2: Polymer with at least 90% by weight methyl methacrylate content, based on the weight of the second shell.

The core may comprise not only the monomers mentioned but also other monomers, as may each of the shells.

By way of example, a preferred acrylate rubber modifier may have the following structure:
Core: copolymer composed of methyl methacrylate (95.7% by weight) ethyl acrylate (4% by weight) and allyl methacrylate (0.3% by weight)
S1: copolymer composed of butyl acrylate (81.2% by weight), styrene (17.5% by weight) and allyl methacrylate (1.3% by weight)
S2: copolymer composed of methyl methacrylate (96% by weight) and ethyl acrylate (4% by weight).

The core:shell(s) ratio of the acrylate rubber modifiers may vary within a wide range. The core:shell ratio C/S is preferably in the range from 20:80 to 80:20, with preference from 30:70 to 70:30 in the case of modifiers with one shell, or in the case of modifiers with two shells the core:shell 1:shell 2 ratio C/S1/S2 is preferably in the range from 10:80:10 to 40:20:40, particularly preferably from 20:60:20 to 30:40:30.

The particle size of the core-shell modifier is usually in the range from 50 to 1000 nm, preferably from 100 to 500 nm and particularly preferably from 150 to 450 nm, with no intended resultant restriction.

Impact modifiers of this type are commercially obtainable from the company Mitsubishi with the trademark META-BLEN® IR 441. It is also possible to obtain impact-modified moulding compositions. Among these are, inter alia, ACRYLITE PLUS® from the producer CYRO Industries.

The inventive injection-moulding process for producing complex light-scattering mouldings of high optical quality is preferably carried out in the manner described below:

The temperature of the molten moulding composition during the inventive injection-moulding process is preferably from 210 to 270° C., and still more preferably from 240 to 250° C., with no intended resultant restriction.

A temperature of the injection-moulding nozzle is moreover preferably from 230 to 270° C., still more preferably from 240 to 250° C., and the temperature of the injection mould is preferably from 40 to 80° C. and still more preferably from 50 to 60° C.

The temperature of the injection-moulding cylinder is preferably from 220 to 260° C. and still more preferably from 230 to 250° C.

In the inventive process, the moulding composition is injected with a pressure in the range from 50 to 1000 bar into the mould. One particular embodiment here applies the pressure in stages, the pressure being 50 bar in the first stage and 400 bar in the second stage.

The injection rate may also be staged, being in the range from 0.01 m/s to 0.1 m/s in the first stage and from 0.1 m/s to 1 m/s in the second stage, and in the range from 0.05 m/s to 0.5 m/s in a possible third stage. The metering stroke here is preferably from 1 to 4 times the screw diameter.

Surprisingly, it has been found that optical inhomogeneity, such as clouding and streaking and weld lines, can be eliminated effectively in complex mouldings if they are produced by the inventive process.

If an injection-moulding process uses spherical plastics particles whose average size is from 1 to 24 µm, in a matrix composed of polymethyl(meth)-acrylate, it is possible to produce complex mouldings of particularly good optical quality and homogeneity, and substantially without clouding, streaking and weld lines. These optical defects can be eliminated with particular success if use is made of scattering agents based on crosslinked silicones or on crosslinked polystyrene with an average particle size of from 2 to 15 µm in a matrix composed of polymethyl (meth)acrylate.

Optical defects, such as clouding, streaking and weld lines, normally occur particularly readily in complex mouldings, such as those with variable thickness and/or with perforations. Thickness differences in the corresponding injection mould, and in particular perforations, i.e. regions around which the melt is injected within the mould, have a marked effect on the rheology of the material as it fills the mould cavity or cavities. The formation of clouding, streaking and weld lines can be promoted if portions of the melt move particularly quickly or particularly slowly.

For the purposes of the present invention, a complex moulding is a moulding which has one or more of the features described below.

In one embodiment of the inventive process, a complex moulding has differing wall thicknesses. The moulding obtained is preferably one whose wall thickness is in the range from 1 to 30 mm and may vary within the moulding. By way of example, the variation in the wall thickness may be stated via the difference between minimum and maximum wall thickness of the moulding, this difference being more than 1 mm, preferably more than 5 mm and particularly preferably more than 10 mm. The maximum-to-minimum wall thickness ratio is preferably in the range ≥1:20 and more preferably in the range ≥1:10, and is particularly preferably ≥1:4, and most preferably ≥1:2.

In another embodiment of the inventive process, a complex moulding has at least one perforation. The wall thickness of the moulding is zero at the site of a perforation. The moulding composition surrounding a perforation may develop a uniform or varying wall thickness in the surrounding region, the wall thickness preferably being within the range stated above.

Another embodiment of the process described above produces a complex moulding which has at least one non-planar surface. This surface is preferably of convex or concave design.

The dimensions and definitions given above for a complex moulding are merely illustrations of preferred products of the inventive process, and these products are certainly not to be interpreted as restricting the general inventive concept.

The mouldings produced by the inventive process preferably have the properties specified below.

One particular embodiment of the moulding obtained from the inventive process has a halved-energy angle ≥5°, in particular ≥14°.

Another particular embodiment of the moulding obtained from the inventive process has a halved-intensity angle ≥1.5°, in particular ≥10°.

In one particular aspect of the present invention, the moulding produced according to the invention has light transmittance greater than or equal to 25%, in particular greater than or equal to 40%, and particularly preferably greater than or equal to 50%, for a layer of thickness 3 mm.

The moulding produced according to the invention preferably has a yellowness index, determined to DIN 6167, smaller than or equal to 12, in particular smaller than or equal to 10, with no intended resultant restriction.

The mouldings produced according to the invention also have excellent mechanical properties, for example, it is possible to obtain mouldings whose Charpy impact strength to ISO 179 is ≥80 kJ/m$^2$. The yield stress to ISO 527 may be adjusted to ≥70 MPa. Another excellent property is a nominal tensile strain break of >50% to ISO 527.

EXAMPLES

The invention is described in more detail below via examples and comparative examples, but there is no intention that the invention be restricted to these examples.

A) Test Methods

D65/2° transmittance was determined to DIN 5036, using Lambda 19 from the company Perkin Elmer.

D65/10° yellowness index was determined to DIN 6167, using Lambda 19 test equipment from the company Perkin Elmer.

Scattering power is determined by measuring the halved-energy angle and the halved-intensity angle to DIN 5036, using a GO-T-1500 LMT goniometer test unit from the company LMT.

A laser extinction method is used to determine particle size, and also particle size distribution. To this end, use was made of Galai CIS-1 equipment from the company L.O.T. GmbH, the method of measurement for determining particle size being described in the user manual.

B) Characterization of the Scattering Agents Used

The scattering agents used in the inventive examples comprise firstly Techpolymer® SBX-8 (producer: Sekisui Chemical Co. Ltd., Japan), TOSPEARL® 120 and TOSPEARL® 3120 (producer: GE Bayer Silicones).

In another inventive example, use was made of a blend composed of a polymer C, prepared using a method based on Example 2 in EP 1 219 641 A1 with a commercially available moulding composition (polymer A) composed of 96% by weight of methyl methacrylate and 4% by weight of methyl acrylate as matrix.

The comparative example used was polymer B, composed of polymer A with 6% by weight content of spherical light-scattering plastics particles based on poly(meth)acrylate copolymers (polymer D) whose average particle diameter is about 50 µm.

Table 1 shows a summary of the properties of the scattering agents used in the inventive examples.

TABLE 1

Characteristics of scattering agents

| | 1 | 2 | 3 | 4 | 5 |
|---|---|---|---|---|---|
| Scattering agent | Polymer C | TECHPOLYMER ® SBX-8 | TOSPEARL ® 120 | TOSPEARL ® 3120 | Polymer D |
| Refractive index $n_{D20}$ | 1.525 | 1.590 | 1.48 | 1.48 | 1.525 |
| Density [g/cm$^3$] | n.d. | 1.06 | 1.32 | 1.32 | n.d. |
| Average particle size [μm] | 20 | 8 | 2 | 12 | 20 |
| Specific surface area [m$^2$/g] | n.d. | n.d. | 15-35 | 18 | n.d. |

C) Preparation of Moulding Compositions

Moulding compositions were prepared using the scattering agents specified in Table 1, at the concentration needed to achieve comparable optical properties to those of the marketed product polymer B (Comparative Example 1, producer: Röhm GmbH & Co. KG, Germany). Once the components had been weighed out, the mixture was mixed by tumbling and compounded in a single-screw extruder.

Table 2 contains the properties of the moulding compositions used in the prior art (Comparative Examples) and, respectively, in the inventive process (Inventive Examples C-1 to C-5). In all cases, polymer A served as matrix material.

The optical properties of a moulding composition with 0.3% of TOSPEARL® 120 are approximately the same as those of polymer B (Comparative Example C-1, Table 2). When Techpolymer® SBX-8 is used as scattering agent, the transmittance is somewhat lower than for polymer B.

TABLE 2

Properties of moulding compositions

| | Inventive Example C-1 | Inventive Example C-2 | Inventive Example C-3 | Inventive Example C-4 | Inventive Example C-5 | Comparative Example C-1 |
|---|---|---|---|---|---|---|
| Moulding composition | 0.4% TECHPOLYMER ® SBX-8 in polymer A | 0.1% TOSPEARL ® 120 in polymer A | 0.3% TOSPEARL ® 120 in polymer A | 0.6% TOSPEARL ® 3120 in polymer A | 3% polymer C in polymer A | Polymer B |
| Halved-energy angle [°] | 16.8 | 10.3 | 17.6 | 14 | 13.5 | 14.9 |
| Halved-intensity angle [°] | 2.5 | 1.5 | 12.5 | 2.5 | 12.5 | 14.5 |
| Light transmittance [%] | 83.8 | 93.6 | 89.2 | 92.4 | 93.0 | 92.1 |
| Yellowness index [-] | 3.7 | -0.25 | 0.9 | 0.3 | 1.0 | 1.9 |
| MVR [cm$^3$/10 min] | 5.0 | 5.2 | 5.1 | 5.3 | 4.7 | 4.7 |

D) Injection-Moulding Parameters

All of the moulding compositions were injection-moulded with the same processing parameters (see Table 3). An improvement in flow properties of the moulding compositions was observed on addition of TOSPEARL® and Techpolymer® SBX-8.

TABLE 3

Settings for processing of the moulding compositions by injection moulding (DEMAG D 150 injection-moulding machine)

| Temperatures [° C.] | |
|---|---|
| Melt | 245 |
| Cylinder | 230; 235; 240; 245 |
| Mould | 55 |
| Hot runner (nozzle, runner) | 246; 246 |
| Metering stroke | 26 mm |
| Injection rate (staged) | |
| Stage 1 (23 mm-20 mm) | 13 |
| Stage 2 (20 mm-15 mm) | 16 |
| Stage 3 (15 mm-0 mm) | 13 |

TABLE 3-continued

Settings for processing of the moulding compositions by injection moulding (DEMAG D 150 injection-moulding machine)

| Hold pressure (staged) | |
|---|---|
| Hold pressure changeover | stroke-dependent at screw stroke 5 mm |
| Stage 1 (18 s) | 82 |
| Stage 2 (8 s) | 75 |

E) Production of Mouldings and Assessment of Optical Quality

Example 1

Moulding Composed of Polymer A with Techpolymer® SBX-8 as Scattering Agent

To prepare the moulding composition, 10 kg of polymer A and 0.3 kg of Techpolymer® SBX-8 with an average particle size of 8 μm were weighed out into a 30 l mixing drum, mixed by tumbling and compounded in the melt in a 35 mm single-screw extruder. Mouldings were then obtained by injection moulding, using a hot-runner mould with the parameters stated in Table 3. Square plaques (100×100 mm) were injection-moulded from the moulding composition, and have four square segments with different wall thicknesses: 1, 2, 3 and 4 mm.

Example 2

Moulding Composed of Polymer A with TOSPEARL® 120 as Scattering Agent

To prepare the moulding composition, 10 kg of glass-clear polymer A and 0.3 kg of TOSPEARL® 120 were processed as described in Example 1, to give a moulding composition. Mouldings were then obtained by injection moulding, using a hot-runner mould with the parameters stated in Table 3. Square plaques (100×100 mm) were injection-moulded from the moulding composition, and have four square segments with different wall thicknesses: 1, 2, 3 and 4 mm.

Example 3

Moulding Composed of Polymer A with TOSPEARL® 3120 as Scattering Agent

To prepare the moulding composition, 10 kg of glass-clear polymer A and 0.3 kg of TOSPEARL® 3120 were processed as described in Example 1, to give a moulding composition. Mouldings were then obtained by injection moulding, using a hot-runner mould with the parameters stated in Table 3. Square plaques (100×100 mm) were injection-moulded from the moulding composition, and have four square segments with different wall thicknesses: 1, 2, 3 and 4 mm.

Example 4

Moulding Composed of Polymer A with Polymer C as Scattering Agent

To prepare the moulding composition, 10 kg of polymer A and 0.3 kg of polymer C were processed as described in Example 1, to give a moulding composition. Square plaques (100×100 mm) were injection-moulded from the moulding composition, and had four square segments with different wall thicknesses: 1, 2, 3 and 4 mm.

Comparative Example

Moulding Composed of Polymer B

Plaques measuring 100×100 mm×1/2/3/4 mm were injection-moulded from polymer B in a DEMAG D 150 injection-moulding machine, by means of a hot-runner injection mould with the parameters stated in Table 3.

The optical quality of the injection-moulded test specimens was assessed visually. Assessment criteria used were the intensity of weld lines, and also of inhomogeneity (clouding, streaking) within the moulding. The results obtained are given in the table below. In the table, an absent feature has been indicated by ++, a low-intensity feature by +, significant intensity by – and very significant intensity by ––.

TABLE 4

| Optical assessment of mouldings | | | | |
|---|---|---|---|---|
| | Weld lines | Clouding | Streaking | Surface defects |
| Inventive Example 1 (Techpolymer ® SBX-8) | + | ++ | ++ | ++ |
| Inventive Example 2 (TOSPEARL ® 120) | + | ++ | ++ | ++ |
| Inventive Example 3 (TOSPEARL ® 3120) | + | ++ | ++ | ++ |
| Inventive Example 4 (Polymer C) | – | + | + | + |
| Comparative Example Polymer B | –– | –– | – | – |

The invention claimed is:

1. A process for producing a light scattering complex molding comprising injecting a molding composition into an injection mold to produce the light scattering complex molding, wherein the light scattering complex molding has one or more complex features selected from a varying wall thickness, at least one perforation and at least one non-planar surface, wherein the light scattering complex molding has a varying wall thickness with a minimum to maximum wall thickness ratio of $\geq 1:4$, wherein the molding composition comprises a matrix comprising polymethyl (meth)acrylate and spherical plastic particles embedded therein, wherein the spherical plastic particles have an average particle diameter of 1-24 µm, have a refractive index that differs from the refractive index of the polymethyl (meth)acrylate by 0.01-0.2 and are present in the matrix in an amount of 0.05-30 wt. %, based on the weight of the polymethyl(meth)acrylate, and wherein the spherical plastic particles are spherical silicone particles and are obtained via hydrolysis and polycondensation of (A) an organotrialkoxysilane of formula $R^1Si(OR^2)_3$ and an organotrialkoxysilane of formula $R^1Si(OR^2)_3$ or (B) an organotrialkoxysilane of formula $R^1Si(OR^2)_3$ and a tetraalkoxysilane of formula $Si(OR^2)_4$, wherein $R^1$ is an alkyl group or an alkenyl group, and $R^2$ is an alkyl group.

2. The process according to claim 1, wherein the light scattering complex molding has a wall thickness of 1-30 mm.

3. The process according to claim 1, wherein the light scattering complex molding has a varying wall thickness with a difference of more than 1 mm between a minimum and maximum wall thickness.

4. The process according to claim 1, wherein the light scattering complex molding has a varying wall thickness with a difference of more than 5 mm between a minimum and maximum wall thickness.

5. The process according to claim 1, wherein the light scattering complex molding has a varying wall thickness with a minimum to maximum wall thickness ratio of $\geq 1:10$.

6. The process according to claim 1, wherein the light scattering complex molding has at least one perforation.

7. The process according to claim 1, wherein the light scattering complex molding has at least one non-planar surface.

8. The process according to claim 1, wherein the polymethyl(meth)acrylate has a refractive index of 1.46-1.54 as measured for the Na D line (589 nm) at 20° C.

9. The process according to claim 1, wherein the spherical plastic particles have an average particle diameter of 2-15 µm.

10. The process according to claim 1, wherein at least 60% of the spherical plastic particles have an average particle diameter of at least 1 µm, and at most 30% of the spherical plastic particles have an average particle diameter of more than 15 µm.

11. The process according to claim 1, wherein the spherical plastic particles are present in the matrix in an amount of 0.1-25 wt. %, based on the weight of the polymethyl(meth)acrylate.

12. The process according to claim 1, wherein the spherical plastic particles comprise a crosslinked silicon, a crosslinked polystyrene, a crosslinked copolymer based on (meth)acrylate and styrene, or a combination thereof.

13. The process according to claim 1, wherein the light scattering complex molding further comprises one or more additives selected from the group consisting of dyes, pigments, fillers, mold release agents, lubricants, flowability improvers, plasticizers, antioxidants, light stabilizers, organophosphorus compounds, antistatic agents, flame retardants, weathering resistant agents and impact modifiers.

14. The process according to claim 1, wherein the molding composition is molten at a temperature of 210-270° C. during said injecting.

15. The process according to claim 1, wherein said injecting involves an injection molding nozzle having a temperature of 230-270° C.

16. The process according to claim 1, wherein the injection mold has a temperature of 40-80° C.

17. The process according to claim 1, wherein said injecting involves an injection molding cylinder having a temperature of 220-260° C.

18. The process according to claim 1, wherein the molding composition is injected into the injection mold with a pressure of 50-1,000 bar.

19. The process according to claim 1, wherein the molding composition is injected into the injection mold with a staged injection rate of 0.01-0.1 m/s in a first stage and 0.1-1 m/s in a second stage.

20. The process according to claim 1, wherein said injecting involves a metering stroke that is 1-4 times a screw diameter.

21. The process according to claim 1, wherein the light scattering complex molding has a halved-energy angle of ≥5.

22. The process according to claim 1, wherein the light scattering complex molding has a halved-intensity angle of ≥1.5 as determined according to Standard DIN 5036.

23. The process according to claim 1, wherein the light scattering complex molding has a light transmittance of ≥50% for a layer having a thickness of 3 mm as determined according to Standard DIN 5036.

24. The process according to claim 1, wherein the light scattering complex molding has a yellowness index of ≤12 as determined according to Standard DIN 6167.

25. The process according to claim 1, wherein the light scattering complex molding has a yield stress of ≥70 MPa as determined according to Standard ISO 527.

26. The process according to claim 1, wherein the light scattering complex molding does not exhibit clouding, streaking and surface defects.

27. The process according to claim 1, wherein the molding composition further comprises an impact modifier having a core:shell 1:shell 2 structure, wherein
    the core comprises at least 90 wt. % methyl methacrylate, based on a total weight of the core;
    the shell 1 comprises at least 80 wt. % butyl acrylate, based on a total weight of the shell 1; and
    the shell 2 comprises at least 90 wt. % methyl methacrylate, based on a total weight of the shell 2.

28. The process according to claim 27, wherein
    the core comprises a copolymer composed of 95.7 wt. % methyl methacrylate, 4.0 wt. % ethyl acrylate, and 0.3 wt. % allyl methacrylate, based on a total weight of the core;
    the shell 1 comprises a copolymer composed of 81.2 wt. % butyl acrylate, 17.5 wt. % styrene, and 1.3 wt. % allyl methacrylate, based on a total weight of the shell 1; and
    the shell 2 comprises 96 wt. % methyl methacrylate, and 4 wt. % ethyl acrylate, based on a total weight of the shell 2.

29. The process according to claim 27, wherein the impact modifier has a core:shell 1:shell 2 ratio of from 10:80:10 to 40:20:40, and a particle diameter of 50-1,000 nm.

30. The process according to claim 27, wherein the impact modifier has a core:shell 1:shell 2 ratio of from 20:60:20 to 30:40:30, and a particle diameter of 100-500 nm.

* * * * *